US008639777B2

(12) United States Patent
Fieau et al.

(10) Patent No.: US 8,639,777 B2
(45) Date of Patent: Jan. 28, 2014

(54) METHOD AND DEVICE FOR REDIRECTING A DATA FLOW MONITORING QUERY

(75) Inventors: Frédéric Fieau, Perros Guirec (FR); Thang Vu Duong, Ploulec'h (FR)

(73) Assignee: France Telecom, Paris (FR)

( * ) Notice: Subject to any disclaimer, the term of this patent is extended or adjusted under 35 U.S.C. 154(b) by 172 days.

(21) Appl. No.: 13/062,906

(22) PCT Filed: Sep. 8, 2009

(86) PCT No.: PCT/FR2009/051685
§ 371 (c)(1),
(2), (4) Date: Mar. 8, 2011

(87) PCT Pub. No.: WO2010/026355
PCT Pub. Date: Mar. 11, 2010

(65) Prior Publication Data
US 2011/0167138 A1 Jul. 7, 2011

(30) Foreign Application Priority Data
Sep. 8, 2008 (FR) ...................................... 08 56022

(51) Int. Cl.
*G06F 15/16* (2006.01)
*G06F 15/177* (2006.01)

(52) U.S. Cl.
USPC ........... 709/219; 709/222; 709/231; 709/236; 709/212; 455/434; 455/436; 455/458; 725/87; 725/91; 725/86; 725/89; 370/331; 370/338; 370/388; 707/602; 707/674; 707/791; 707/793

(58) Field of Classification Search
USPC ......................................... 709/219, 203, 226
See application file for complete search history.

(56) References Cited

U.S. PATENT DOCUMENTS

| | | | |
|---|---|---|---|
| 6,412,015 B1* | 6/2002 | Navare et al. ................. | 709/250 |
| 6,658,473 B1* | 12/2003 | Block et al. .................. | 709/226 |
| 6,782,411 B2* | 8/2004 | Navare et al. ................. | 709/203 |
| 7,017,174 B1 | 3/2006 | Sheedy | |
| 8,121,034 B2* | 2/2012 | Guillouard et al. ........... | 370/235 |
| 2003/0002865 A1* | 1/2003 | Matsui et al. ................. | 386/125 |
| 2004/0015992 A1* | 1/2004 | Hasegawa et al. ............. | 725/86 |
| 2007/0078858 A1* | 4/2007 | Taylor et al. .................... | 707/10 |
| 2009/0125773 A1* | 5/2009 | Lee et al. ...................... | 714/748 |
| 2010/0064000 A1* | 3/2010 | Stroffolino .................... | 709/203 |

FOREIGN PATENT DOCUMENTS

| EP | 1 768 347 | 3/2007 |
|---|---|---|
| EP | 1 962 508 | 8/2008 |
| WO | WO 2006/103223 | 10/2006 |

* cited by examiner

*Primary Examiner* — Jude Jean Gilles
(74) *Attorney, Agent, or Firm* — Knobbe Martens Olson & Bear LLP (57) ABSTRACT

A method of redirecting a request (R_act) sent by a terminal equipment (STB) for control of a data stream ($FL_0$) broadcast by a source (HE) in a telecommunications network. The method comprises: on reception of a request to control a data stream sent by a terminal equipment (STB), a step of obtaining info cation representing a current data stream control capacity for a plurality (11) of broadcast servers; a step of selecting, with the aid of the above information, a server ($NTSS_{k0}$) from said plurality of servers able to control said data stream ($FL_0$) broadcast by the source, a step of sending a request to capture this data stream to the selected server if it is not already capturing the data stream for at least one other terminal equipment; and a step of redirecting the control request to the selected server.

11 Claims, 5 Drawing Sheets

METHOD AND DEVICE FOR REDIRECTING A DATA FLOW MONITORING QUERY

RELATED APPLICATIONS

This is a U.S. National Phase Application under 35 USC §371 of International Application PCT/FR2009/051685, filed on Sep. 8, 2009.

This application claims the priority of French application Ser. No. 08/56022 filed on Sep. 8, 2008, the content of which is hereby incorporated by reference.

BACKGROUND OF THE INVENTION

The present invention relates to the general field of telecommunications.

It relates more particularly to mechanisms for controlling data streams broadcast by a source over an IP network, for example multimedia data streams broadcast in multicast mode in an Internet Protocol TV (IPTV) infrastructure.

A preferred application of the invention, which is not limiting on the invention, is in the context of managing and using a time shifting service managed by a telecommunications network. This kind of service is known as network time shifting (nTS).

As known in the art, an nTS service enables an end user receiving on terminal equipment an IPTV data stream broadcast in real time (commonly called a "live data stream") to command control operations on the data stream (or to be more precise a recording of the data stream) in a manner analogous to a video recorder, for example control operations such as play, pause, rewind, stop, etc.

The deployment of such a service by a telecommunications network operator requires broadcast servers in the network. These broadcast servers must be adapted to capture (i.e. to record) in circular buffers the data streams for which the operator wishes to offer this service and then to broadcast these data streams to the terminal equipments of users subscribing to the service as a function of the operations requested by those subscribers.

In the prior art, the broadcast servers in question are programmed with a predefined list of data streams to be captured to enable permanent capture of all the data streams for which the operator wishes to offer this service. This therefore requires the deployment of a large number of servers and/or servers of very high capacity, in order to be able to offer this service for a large number of data streams (i.e. channels broadcast by the telecommunications network) and for a large number of subscribers. This constraint is especially problematic given that at present the number of data streams broadcast over telecommunications networks is constantly growing.

There is therefore a need for a solution for managing a control service of this kind that does not have these drawbacks.

SUMMARY OF THE INVENTION

One aspect of the present invention is directed to a method of redirecting a request sent by a terminal equipment for control of a data stream broadcast by a source in a telecommunications network, said method comprising:

- on reception of said request, a step of obtaining information representing a current data stream control capacity for a plurality of broadcast servers;
- a step of selecting from said plurality of servers, with the aid of the above information, a server able to control the data stream broadcast by the source;
- a step of sending a request to capture this data stream to the selected server if it is not already capturing said data stream for at least one other terminal equipment; and
- a step of redirecting the control request to the selected server.

Another aspect of the invention provides a device for redirecting a request sent by a terminal equipment to control a data stream broadcast by a source in a telecommunications network, said device comprising:

- means activated on reception of said request for obtaining information representing a current data stream control capacity for a plurality of broadcast servers;
- means for selecting from said plurality of servers, with the aid of at least the above information, a server able to control the data stream broadcast by the source;
- means for determining whether the selected server is already capturing said data stream for at least one other terminal equipment or not;
- means for sending a request to capture this data stream to the selected server, and activated if said server is not already capturing said data stream for at least one other terminal equipment; and
- means for redirecting the control request to the selected server.

It should be noted that, in the context of the invention, a request to control a data stream may refer interchangeably to a request to activate or deactivate control of the data stream, a request to set up a control session of that data stream or a request to activate a specific control operation on that data stream, for example a pause, play or rewind operation.

Moreover, in the context of the invention, the current data stream control capacity of a broadcast server characterizes its ability to control a data stream at the present time, i.e. to capture it and to broadcast it to a terminal equipment in order to be able to apply control operations to the data stream, allowing also for data streams already being controlled by the server at this present time. Here capturing a data stream means recording the data stream. For example, the current data stream control capacity of a server may thus be expressed in the form of a bit rate or a plurality of data streams that can still be controlled by the server given the data streams already being controlled by the server at the current time.

The invention finds a preferred application in managing the control of an nTS time shifting service data stream managed by the telecommunications network. The terminal equipment may then be a TV decoder (set-top box), for example.

Thus in this context the invention allows management and dynamic activation of the recording of a data stream broadcast over the telecommunications network by a broadcast server as a function of requests from the terminal equipments receiving this data stream.

This advantageously reduces the number of broadcast servers required to provide an nTS service with the benefit of such dynamic management and the capacities of these servers, notably in terms of storage space, which reduces the deployment costs necessary to provide the service.

In contrast to the prior art techniques, the invention makes it possible for the broadcast servers to capture only those data streams for which control (i.e. the nTS service) has been requested by a terminal equipment. Thus for simplicity the remainder of this document refers to a dynamic nTS service.

Thus smaller broadcast servers may be used to implement the invention, which allows these servers to be deployed closer to the terminal equipments in the network (for example at the edge of or in the collection (backhaul) network). However, these broadcast servers could of course also be deployed, as in the prior art, at the points of presence (POP) of the network at the junction between the collection network and the core (backbone) network.

The invention has the further advantage of enabling congestion in the broadcast servers to be controlled by using information representing a current data stream control capacity of the broadcast servers (i.e. reflecting the status of the control resources available in the broadcast server at the time the redirection device processes the control request) to select a broadcast server able to control the data stream, in other words to capture it and to broadcast it to the terminal equipment.

In one particular implementation of the invention, the information representing a current data stream control capacity of a broadcast server includes information representing:

- a current broadcast session capacity of that server (i.e. the current ability of the server to broadcast a data stream to a terminal equipment given the data streams already being broadcast by the server); and
- a current data stream capture capacity of that server (i.e. the current ability of the server to capture a data stream given the data streams already being captured by the server).

Thus the redirection method of the invention considers that a broadcast server is able to control a data stream providing its current capture and broadcast session capacities are sufficient for that data stream.

If a server is already capturing this data stream for another terminal equipment, it is considered to have sufficient current capture capacity for that data stream. Information representing a current capture capacity of the server could then consist of information to the effect that this server is capturing this data stream.

It should be noted that the invention has the advantage of making it possible to combine static capture (recording) of the data streams, i.e. as in the prior art where the broadcast servers are programmed with a predefined list of data streams to be captured to enable the constant capture of those data streams, and dynamic capture, i.e. as made possible by the invention as a function of the requirements of the terminal equipments.

In one particular implementation, the redirection method further includes, after the selection step, a step of setting up a session with the terminal equipment for this data stream. During this session, at least one other request to control this data stream sent by the terminal equipment is redirected to the selected server.

In a correlated way, the redirection device may further include means for setting up a session with the terminal equipment for this data stream, the redirection means of the device redirecting at least one other request to control this data stream sent by the terminal equipment to the selected server during this session.

Thus the selection step is carried out only once, for example the first time that the terminal equipment sends a request to control a given data stream, whether or not that request includes a data stream control operation. This allows acceleration of execution of the dynamic nTS service of the invention.

Selecting the broadcast server to which to redirect requests from the terminal equipment may also depend on the proximity of the server to the terminal equipment in the telecommunications network. For example a broadcast server able to capture and to broadcast the data streams and belonging to the same sub-network of the telecommunications network as the terminal equipment would be selected. This optimizes the speed and reliability of execution of the dynamic nTS service of the invention (in particular the latency and the loss of packets caused by the data packets of the data stream following a route in the network that is too long are limited).

The server may equally be selected as a function of whether it is already capturing the data stream for at least one other terminal equipment.

This optimizes the storage space (random access memory (RAM) or disks, for example) required to provide the nTS service, because the same data stream is broadcast by only one server. Of course, a plurality of broadcast servers may capture and broadcast the same data stream anyway, especially should this prove necessary, for example because their respective capacities are not sufficient to satisfy all the terminal equipments requesting nTS operations on this data stream (for which the demand is very high).

It should be noted that other selection criteria could be considered as a function of the policy of the operator of the telecommunications network offering the dynamic nTS service.

For example, the selection step may also take into account a data stream capture type for at least one broadcast server, this type being selectable from at least a static capture type and a dynamic capture type.

To this end in particular, the operator could specify, in a database defining the service management policy:

- the data stream recorded statically in different broadcast servers, for example streams coming from groups of subject-oriented or regional channels; and
- the dynamically recorded data streams.

The capture type may be chosen in accordance with various criteria, for example the audience for a given channel: thus, if a channel has an audience rating above a certain threshold, the data streams that it broadcasts could be switched in the list of static captures for a predetermined time.

In one particular implementation of the invention, the redirection method further comprises:

- a step of detecting an event deactivating control of the data stream by the terminal equipment;
- a step of determining whether the server selected for the data stream for the terminal equipment is capturing that data stream for at least one other terminal equipment;
- if not, a step of sending the selected server a request to end capture of this data stream.

In a correlated way, the redirection device may further comprise:

- means for detecting an event deactivating control of the data stream by the terminal equipment;
- means for determining whether the server selected for the data stream for the terminal equipment is capturing that data stream for at least one other terminal equipment; and
- means that are activated if this is not so for sending the selected server a request to end capture of this data stream.

This avoids capturing data streams which none of the terminal equipments require to control.

Alternatively, the redirection method further includes a step of determining a data stream capture type, said capture type being selected from at least a static capture type and a dynamic capture type, and, if it is determined that the capture type is static, the step of sending a request to end capture of the data stream is not executed.

In one particular implementation of the invention, the redirection method includes, before redirecting a control request to the selected server:

- a step of detecting whether the control request includes a control operation that cannot be executed by the selected server; and a step of replacing that control operation in the control request with an authorized control operation.

In a correlated way, the redirection device may further comprise:

means for detecting that the control request includes a control operation that cannot be executed by the selected server; and means for replacing that control operation in the control request with an authorized control operation;

said detection and replacement means being activated before the redirection of a control request to the server selected by the redirection means.

As a result, it is possible to anticipate errors that may occur in the broadcast server, notably when capture of the data stream has recently begun and the broadcast server cannot provide some data stream control operations, for example a rewind operation (the buffer containing the recording being insufficiently filled). To avoid this, the rewind operation in the request from the terminal equipment may advantageously be replaced by a pause operation, for example.

In other implementations, the redirection method and device of the invention having some or all of the above-mentioned features in combination may be envisaged.

In one particular implementation, the steps of the redirection method are determined by computer program instructions.

Consequently, one aspect of the invention provides a computer program on an information medium and adapted to be executed in a redirection device or more generally in a computer, the program including instructions adapted to execute the steps of a redirection method as described above.

This program may use any programming language and take the form of source code, object code or a code intermediate between source code and object code, such as in a partially-compiled form, or any other desirable form.

Another aspect of the invention provides a computer-readable information medium containing instructions of a computer program as referred to above.

The information medium may be any entity or device capable of storing the program. For example, the medium may include storage means, such as a read only memory (ROM), for example a compact disk (CD) ROM or a microelectronic circuit ROM, or magnetic storage means, for example a floppy disk or a hard disk.

Furthermore, the information medium may be a transmissible medium such as an electrical or optical signal, which may be routed via an electrical or optical cable, by radio or by other means. The program of the invention may in particular be downloaded over an Internet-type network.

Alternatively, the information medium may be an integrated circuit in which the program is incorporated, the circuit being adapted to execute the method in question or to be used in its execution.

BRIEF DESCRIPTION OF THE DRAWINGS

Other features and advantages of the present invention emerge from the description given below with reference to the appended drawings that show a non-limiting embodiment of the present invention. In the figures.

DETAILED DESCRIPTION OF ONE EMBODIMENT

Figure 1:
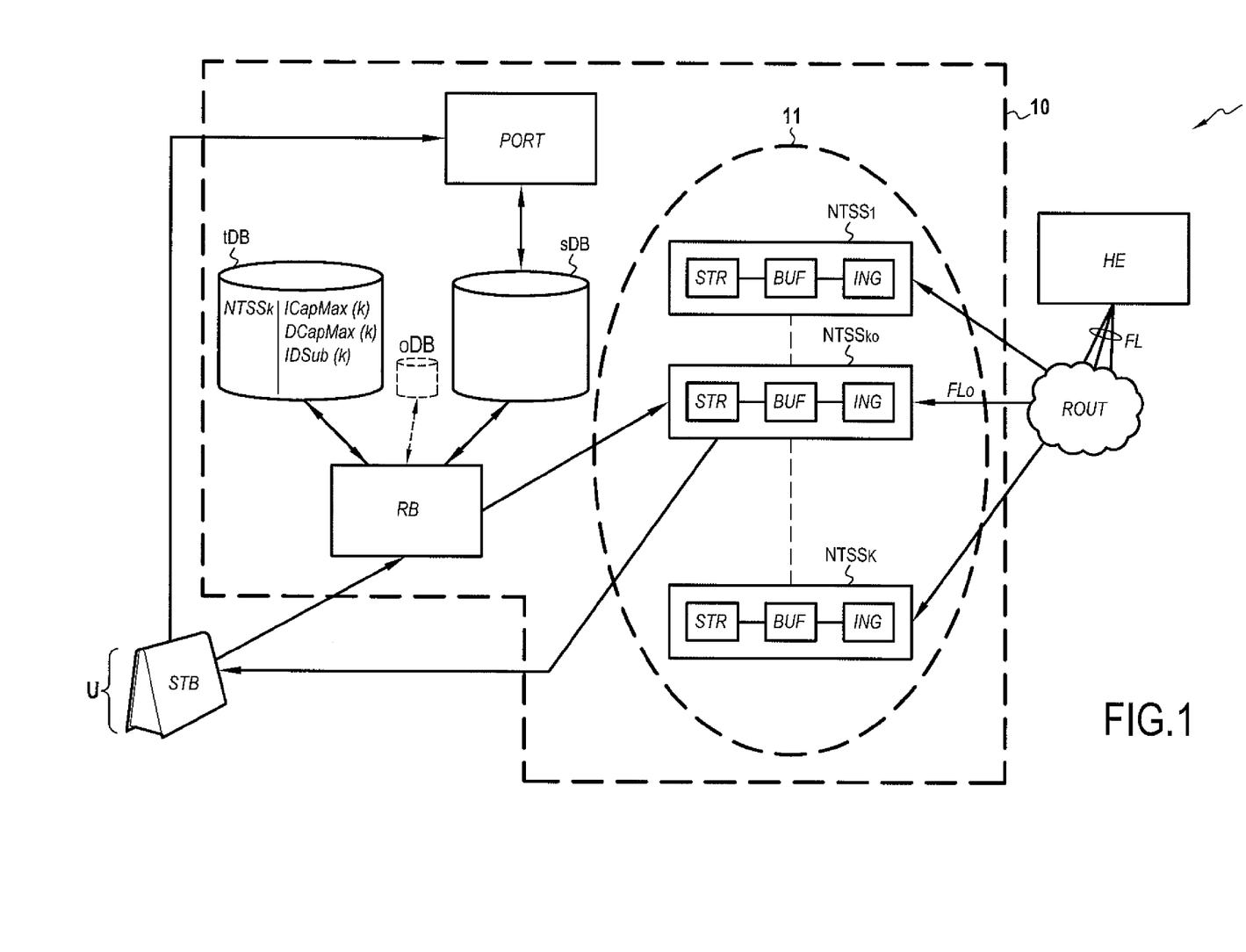
FIG. 1 represents a redirection device of one particular embodiment of the invention in its environment.

FIG. 1 shows the use of the invention to control an nTS time shifting service for data stream managed by a telecommunications network 1.

As described above, an nTS service allows an end user receiving on a terminal equipment an IPTV data stream broadcast in real time by a source in a telecommunications network to command control operations on that data stream analogous to those provided by a video recorder.

In the embodiment described here, the telecommunications network 1 has an IPTV infrastructure allowing broadcasting of IPTV multimedia data streams in real time using known multicast and streaming mechanisms. As known in the art, the term streaming refers to the broadcasting mechanism that continuously sends data from a source to a destination without the destination having to download or store all the data.

To this end, the IPTV infrastructure of the network 1 includes a network head end HE (which is the source in the context of the invention) adapted to generate and to broadcast in the telecommunications network 1 data streams FL. These data streams consist here of a series of packets that transport multimedia TV data (data broadcast on audiovisual program channels).

The IPTV infrastructure of the network 1 also includes equipments ROUT (such as routers) allowing broadcasting of the data streams FL in multicast mode. As known in the art, multicasting allows organization and optimization of the sending of the same data stream by a source to a plurality of destinations, thus avoiding unnecessary replication of data packets in the network.

It should be noted that the invention also applies if broadcasting the data stream between the source and the terminal equipment in unicast mode is envisaged. The person skilled in the art will easily know how to transpose the embodiment described here to the unicast context and such transposition is not described in more detail here.

The data streams FL are received and decoded by a terminal equipment STB of an end user U. This terminal equipment is a TV decoder box or set-top box here, for example. Of course, other terminal equipments equipped with such a decoder may be considered.

To offer a dynamic nTS service as proposed by the invention, the IPTV infrastructure of the network 1 includes an nTS system 10 including:

a set 11 of K broadcast servers $NTSS_1$ to $NTSS_K$;

a redirection device RB of the invention also referred to as a redirection server;

a server PORT hosting a portal dedicated to the nTS service;

a "dynamic" session database sDB;

a "static" topology database tDB.

Optionally, the system 10 may also include an operator database oDB (represented in dashed line in FIG. 1) specifying a policy of the operator and a type of capture (static or dynamic) of the data streams as a function of the program channels that broadcast them for one or more broadcast servers of the set 11.

The broadcast servers $NTSS_k$, k=1 to K, implement nTS services like those offered in the prior art.

Here each of these broadcast servers has the hardware architecture of a computer and includes a processor, a random-access memory (RAM) and a read-only memory (ROM), which are not shown.

It also includes data stream capture means ING enabling it, at the request of the redirection server:
- to subscribe to at least one router ROUT to receive one or more particular data streams broadcast in multicast mode by the network head end HE and for which the nTS service is required; and
- to unsubscribe from that same router so as no longer to receive any of those data streams.

These subscribing and unsubscribing operations are carried out by the means ING using the Internet Group Management Protocol (IGMP), for example.

The means ING capture (record) a data stream to which the server $NTSS_k$ subscribes in a circular buffer BUF of predefined size. This circular buffer is in a storage space of the server $NTSS_k$, for example in the random-access memory or on a hard disk of the server. The present description considers a circular buffer for each captured data stream.

What is more, the server $NTSS_k$ also includes broadcast means STR for interpreting and processing a control request sent by a terminal equipment for a particular data stream. Such a request may include a play, pause, etc. operation and conforms to a predefined protocol.

In the implementation described here, control requests sent by the terminal equipment STB in the context of the dynamic nTS service are Real Time Streaming Protocol (RTSP) requests. Thus here the means STR implement the RTSP protocol known to the person skilled in the art. That protocol is described in particular in the IETF document RFC 2326 entitled "Real Time Streaming Protocol".

Alternatively, these requests may conform to other application protocols such as the Session Initiation Protocol (SIP) or the HyperText Transfer Protocol (HTTP).

The means STR also unicast to the terminal equipment the content of the circular buffer BUF corresponding to a control operation contained in an RTSP control request sent by that equipment. They may in particular use for this purpose a known transport protocol such as RTP/UDP, UDP, TOP, or HTTP.

It should be noted that the means ING and STR and the operating principle of a circular buffer are known to the person skilled in the art and are not further described here.

Furthermore, in the example described here, the capture means ING and the broadcast means STR are implemented by a single device (e.g. a single computer), namely the NTSS server. However, the means ING, the means STR and the circular buffer BUF may instead be implemented by separate devices; the expression NTSS server will then be understood as meaning a system comprising those various devices.

Figure 2:
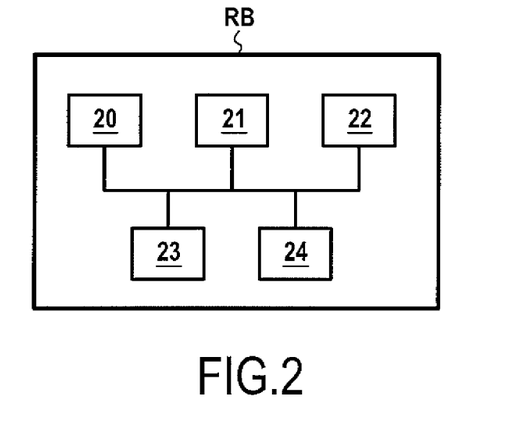
FIG. 2 represents the hardware architecture of a redirection device in one particular embodiment of the invention.

The redirection server RB conforms to the invention. Here it has the hardware architecture of a computer, as represented in FIG. 2, and includes a processor 20, a random-access memory (RAM) 21, and a read-only memory (ROM) 22.

The read-only memory 22 constitutes a storage medium of the invention, readable by the redirection server RB, and storing a computer program of the invention. That program includes instructions for executing the steps of a redirection method of the invention. The main steps of this method in one particular implementation of the invention are shown in FIGS. 3A-3D described below (steps F10 to F190).

The redirection server RB also includes means 23 for communicating with the terminal equipment STB and with the broadcast servers $NTSS_k$ using the RTSP protocol in the example described here.

It further includes means 24 for consulting and updating the sessions database sDB. Those means 24 are also adapted to consult the topology database tDB.

The topology database tDB contains for each server $NTSS_k$:
- its maximum data stream capture capacity, denoted ICapMax(k), i.e. the maximum number of data streams that can be captured (recorded) simultaneously by the server $NTSS_k$; this capacity takes account of the capture and processing resources used by the server $NTSS_k$ to provide the control operations on a particular data stream requested by a terminal equipment; and
- its maximum broadcast sessions capacity, denoted DCapMax(k), i.e. the maximum number of broadcast sessions that can be managed simultaneously by the server for different terminal equipments; as known in the art, a broadcast session includes the data stream broadcast between the broadcast server and a terminal equipment, control data streams exchanged between the terminal equipment and the broadcast server and control data streams exchanged between the redirection server and the broadcast server; this capacity therefore takes into account the processing and broadcast resources used by the server $NTSS_k$ to provide the control operations on a particular data stream requested by a terminal equipment.

The capacities ICapMax(k) and DCapMax(k) constitute static data, i.e. data that does not vary and depends on the specifications in terms of the resources of the server $NTSS_k$ (e.g. storage space, processor performance, etc.). They may vary from one server NTSS to another.

This static data may be provided in the database tDB or communicated beforehand by the servers $NTSS_k$.

In the example described here, the topology database tDB also includes a server location parameter for each server $NTSS_k$. Here this location parameter is an identifier IDSub(k) of the sub-network of the telecommunications network 1 to which the server $NTSS_k$ belongs, to be more precise an IP address, for example.

Alternatively, other sub-network identifiers may be considered, as well as other location parameters (for example a Calling Line IDentifier (CLID) parameter).

The sessions database sDB includes at a given time:
- a list of current data stream capture sessions executed by the servers $NTSS_k$ of the set 11 at that time; and
- a list of current broadcast sessions managed by the servers $NTSS_k$ of the set 11 at that time.

Each current data stream capture session is defined in the database sDB by:
- an identifier of the server NTSS capturing the data stream;
- an identifier of the captured data stream;
- an indicator of the time at which data stream capture began.

Each current data stream broadcast session is defined in the database sDB by:
- an identifier of the broadcast data stream;
- an identifier of the server NTSS controlling the broadcast;
- an identifier of the terminal equipment that requested control.

There are described below with reference to FIGS. 3A to 3D the main steps of the redirection method of one particular implementation of the invention executed by the redirection server RB represented in FIGS. 1 and 2.

Figure 3A:
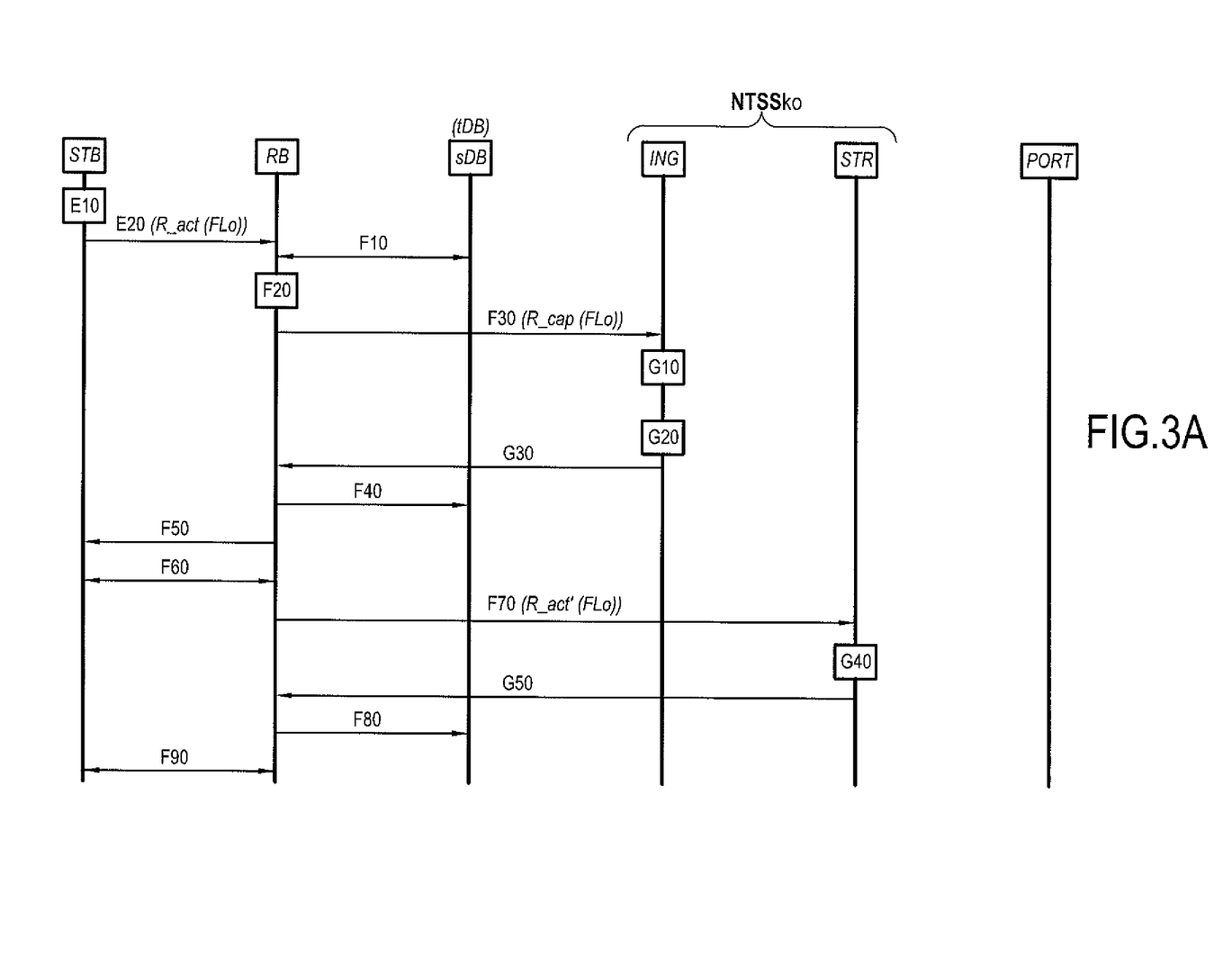
FIGS. 3A-3D represent the main steps of a redirection method of one particular implementation of the invention when executed by a redirection device as shown in FIGS. 1 and 2.

In this implementation it is envisaged that the user U of the terminal equipment STB wishes to access the dynamic nTS service offered by the operator of the telecommunications network 1 in order to effect time-shifting operations on a multimedia data stream $FL_0$ received in real time by the terminal equipment STB, for example a rewind operation OP (a control operation in the context of the invention).

Referring to FIG. 3A, it is assumed that for this purpose the user U has previously subscribed to this service provided by the server PORT and that the terminal equipment STB obtains authorization to access the dynamic nTS service, for example by being authenticated correctly by the server PORT.

It should be noted that to be able to benefit from this service the terminal equipment STB will first have unsubscribed from multicasting of the data stream $FL_0$ by the router ROUT.

Alternatively, another equipment of the network could be made responsible for unsubscribing, for example a digital subscriber line access multiplexer (DSLAM) of the network 1 connected to the terminal equipment STB.

To access the rewind operation OP, the user U presses a corresponding key of a remote control of the terminal equipment STB, for example, which sends to the terminal equipment the request from the user U to access the operation OP.

On reception of this access request (step E10), the terminal equipment STB sends the redirection server RB a request $R\_act(FL_0)$ to initialize a control session for the data stream $FL_0$ (step E20). This request is a control request in the context of the invention.

Here the request $R\_act$ ($FL_0$) is an RTSP request including an identifier of the data stream $FL_0$ (e.g. a multicast IP address). It may also include the command relating to the control operation OP on the data stream $FL_0$ requested by the user U. However, this command could be sent to the redirection server RB subsequently, once the control session has been set up (as in the implementation described here).

On reception of the control request $R\_act$, the server RB selects a server $NTSS_{k0}$ from the plurality 11 of broadcast servers according to predetermined criteria.

To this end, the redirection server RB first consults the session database sDB using the consultation means 24 (step F10) to obtain for each server $NTSS_k$:
 the current number ICurr(k) of data streams captured simultaneously by this server at this time (i.e. the current number of capture sessions);
 the current number DCurr(k) of broadcast sessions managed simultaneously by the server at this time; and
 the identifiers of the data streams captured by this server.

The numbers ICurr(k) and DCurr(k) are computed in the known way by the means for consulting the database sDB from the broadcast session and capture session information stored in that database, for example using an appropriate consultation request that will be evident to the person skilled in the art.

During this step, the redirection server RB also consults the topology database tDB to obtain the maximum capacities ICapMax(k) and DCapMax(k) for each server $NTSS_k$.

From this information it evaluates the values of [ICapMax(k)−ICurr(k)] and [DCapMax(k)−DCurr(k)] respectively representing the current capture and broadcast session capacities of the server $NTSS_k$ and more generally a current data stream control capacity of the server $NTSS_k$. It should be noted that in this example the capture and broadcast session capacities are expressed as numbers of data streams, although this hypothesis is not limiting on the invention; for example, these capacities could be expressed as bit rates. The same applies to the data stream control capacity of the server, of course.

Using these values, the redirection server next (step F20) constructs a list L of potential candidate servers NTSS from the servers $NTSS_k$, i.e. servers able to capture the data stream $FL_0$ and to set up a session for broadcasting that data stream for the terminal equipment STB (in other words, which have a sufficient, for example non-zero, current data stream control capacity).

To be more precise, this list consists here of the servers $NTSS_k$ from the plurality 11 of servers for which the following condition (1) or (2) is satisfied:
 Condition (1): a server is a potential candidate if it has a current data stream capture capacity and a current broadcast session capacity that are sufficient to provide the service (i.e. above predetermined thresholds $\epsilon1$ and $\epsilon2 \geq 0$), for example here if:

$[ICapMax(k)-ICurr(k)] > \epsilon1$ and $[DCapMax(k)-DCurr(k)] > \beta2$

Condition (2): a server is a potential candidate if it has a current broadcast session capacity sufficient to provide the service (i.e. above a predetermined threshold $\epsilon2$) and if it is already capturing the data stream $FL_0$ for another terminal equipment, for example here if:

$[DCapMax(k)-DCurr(k)] > \epsilon2$ and the server is already capturing the data stream $FL_0$ for another terminal equipment.

It should be noted that, for a server satisfying condition (2), information representing a current capture capacity of that server in the sense of the invention may consist of information to the effect that this server is capturing the data stream required by the terminal equipment.

In the example described here, if the list L obtained in this way includes a plurality of potential candidate servers NTSS, the redirection server RB then preferably selects, in this order:
 a server $NTSS_{k0}$ from this list already capturing the data stream $FL_0$ for another terminal equipment;
 the server $NTSS_{k0}$ from the list nearest to the terminal equipment STB in the network 1.

Here a server NTSS is considered as that nearest to the terminal equipment STB if it belongs to the same sub-network in the network 1 as the terminal equipment STB. To determine this server, the redirection server RB extracts from the control request $R\_act$ the IP address of the terminal equipment STB (the address sent in the request in a manner known in the art), and compares it to the identifiers IDSub(k) of the sub-networks of the servers $NTSS_k$ from the list L. These identifiers are obtained by the means 24 consulting the topology database tDB.

Of course other identifiers could be considered.

Alternatively, if the list L includes a plurality of potential candidate servers $NTSS_k$, other selection criteria may be used to select the server $NTSS_{k0}$.

For example, it is possible to consider a load-balancing criterion that alternately selects potential candidate servers from the list for different terminal equipments. Other load-balancing strategies may of course be considered, such as selecting the server capturing the fewest data streams.

In a variant, during this step, the redirection server RB also consults the operator database oDB to obtain the type of record specified for the data stream that is the subject of the control request. When drawing up the list L, it could advantageously give preference to a server $NTSS_{k0}$ from the list that is capturing the data stream $FL_0$ statically.

It is assumed here that in the list L there is no potential candidate server already capturing the data stream $FL_0$ for another terminal equipment. The server $NTSS_{k0}$ nearest to the terminal equipment STB is therefore selected, as explained above.

As this server $NTSS_{k0}$ is not capturing the data stream $FL_0$, the redirection server RB sends the means ING of the server $NTSS_{k0}$ an RTSP request $R\_cap(FL_0)$ to capture the data stream $FL_0$ (step F30).

This request is processed by the means INC, which then send a request to subscribe to the data stream $FL_0$ to the router ROUT (for example using the IGMP), in order to benefit from multicasting of the data stream $FL_0$ by the network head end HE (step G10).

Alternatively, to benefit from a unicast data stream $FL_0$, a RTSP Setup or HTTP Setup request may be sent to a network equipment of the server or RTSP proxy type or to a network equipment of the server or HTTP proxy type, respectively.

Following this subscription, a session for capturing the data stream $FL_0$ is initiated by the means INC (step G20). In other words, the means ING store the data stream $FL_0$ multicast in real time by the network head end HE in a circular buffer BUF associated with the data stream $FL_0$.

They then send an RTSP acknowledgement message ACK (e.g. RTSP 200 OK) to the redirection server RB in response to the capture request $R\_cap(FL_0)$ (step G30).

On reception of this acknowledgement message, the redirection server RB updates the dynamic database sDB (step F40) with a new entry consisting of the data stream $FL_0$ capture session initiated by the server $NTSS_{k0}$. As mentioned above, this new capture session is represented in the dynamic database sDB by:

the identifier of the server $NTSS_{k0}$;
the identifier of the data stream $FL_0$; and
an indicator $t_0$ of the time at which capture of the data stream began.

It should be noted that if a server $NTSS_{k0}$ is selected during the step F20 that is already capturing the data stream $FL_0$ for another terminal equipment, the steps F30 of sending a capture request to the server $NTSS_{k0}$, G10 of subscribing to the server $NTSS_{k0}$, G20 of initiating a capture session for the data stream $FL_0$, G30 of sending an acknowledgement message to the redirection server RB, and F40 of updating the database sDB are not executed, the server $NTSS_{k0}$ already subscribing to the broadcasting of the data stream $FL_0$ and being in the process of recording that data stream.

Following updating of the database sDB, the redirection server sends the terminal equipment an acknowledgement message (e.g. RTSP 200 OK) in response to the control request $R\_act$ (step F50).

A control session SESS is then set up between the terminal equipment STB and the redirection server RB (step F60). Setting up this RTSP session includes creating a context (i.e. a data set) associated with the session and saved in the database sDB, for example. Such a context includes, as known in the art, a session identifier, an identifier of the terminal equipment STB (e.g. its IP address), and an identifier of the server $NTSS_{k0}$.

Following the setting up of this session, the control request $R\_act$ sent by the terminal equipment STB to the redirection server RB is redirected by that server to the broadcasting means STR of the server $NTSS_{k0}$ in the form of an RTSP control request $R\_act'$ (step F70).

The broadcast server $NTSS_{k0}$ then sets up a broadcast session for the data stream $FL_0$ and the terminal equipment STB (step G40) and advises the redirection server RB of this (step G50), which server updates the dynamic database sDB with this new broadcast session (step F80). As mentioned above, this new broadcast session is represented in the database sDB by:

the identifier of the server $NTSS_{k0}$;
the identifier of the data stream $FL_0$; and
the identifier of the terminal equipment STB.

It should be noted that the redirected request $R\_act'$ may be either identical to the control request $R\_act$ or slightly modified so as to integrate in particular parameters of the server $NTSS_{k0}$ such as its IP address or a port number.

It should also be noted that in order to keep alive the session SESS between the terminal equipment STB and the redirection server, here the redirection server periodically sends the terminal equipment session keep alive messages (step F90). For this the server RB may in particular use the RTSP, SIP or HTTP protocol. If no response to these messages is received from the terminal equipment in a predetermined time interval following their sending, the redirection server RB terminates the control session SESS. Otherwise, the session SESS continues.

Alternatively, it is not the redirection server RB that sends periodic keep alive messages but the terminal equipment STB. Similarly, if the server RB receives no such message in a predetermined time interval, then it terminates the session SESS set up with the terminal equipment STB.

Figure 3B:
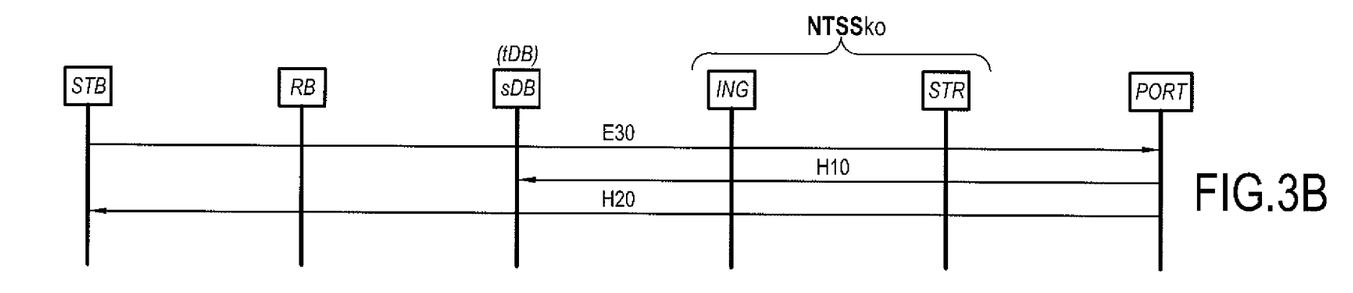

Referring to FIG. 3B, in the implementation described here, to facilitate interaction of the user U with the dynamic nTS service, the terminal equipment STB sends a request to the portal PORT in order to obtain the status of the buffer BUF associated with the data stream $FL_0$ (step E30). This request may in particular be an HTTP or SIP request. Here the status of the buffer means how full it is.

This filling status is calculated by the portal PORT from the start time $t_0$ of the session for capturing the data stream $FL_0$ by the server $NTSS_{k0}$, provided of course that (as assumed here) how full the buffers have been filled by the servers NTSS and the size of the buffers are known.

The portal PORT obtains the start time $t_0$ by consulting the database sDB (step H10).

In response to the request from the terminal equipment STB, the server PORT sends the calculated filling status, for example in the form of a progress bar displayed on the screen of the user U (step H20) and updated in real time.

Figure 3C:
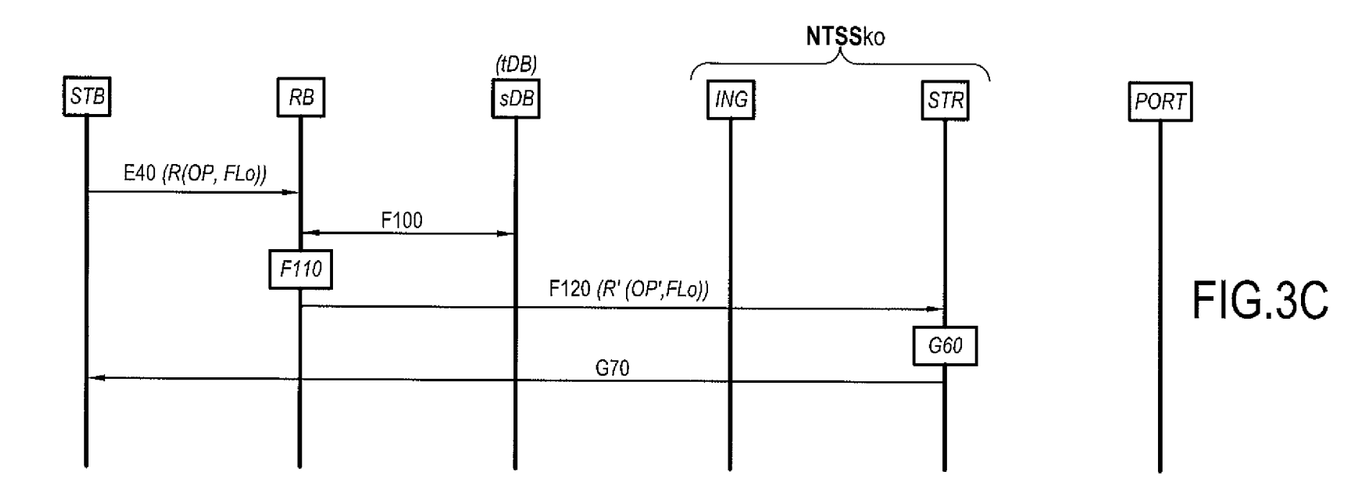

Referring to FIG. 3C, following setting up of the control session SESS, the terminal equipment STB sends the redirection server RB a request to activate the operation OP (step E40). In the example described here, as mentioned above, it is assumed that this operation OP on the data stream $FL_0$ is a rewind operation to a predetermined time $t_1$, in order to watch the data stream again from that time $t_1$. Of course, other time shifting operations may be requested, for example play, pause, etc.

The activation request $R(OP, FL_0)$ is a control request in the context of the invention and includes the required operation OP on the data stream $FL_0$ and the time $t_1$.

On reception of this request, the server RB consults the database sDB (step F100) to determine whether a control session has already been set up with the terminal equipment STB for the data stream $FL_0$.

If so (for example because here the session SESS has already been set up), it identifies from the context of that session the server $NTSS_{k0}$ to which to redirect the control requests and more particularly requests to activate time shifting operations during the session (step F110).

The request $R(OP, FL_0)$ is then redirected to the means STR of the server $NTSS_{k0}$ in the form of a request R' (step F120).

In the implementation described here, during the step F110, the redirection server RB also determines, by consulting the session database sDB, the start time $t_0$ of the capture session for the data stream $FL_0$ by the server $NTSS_{k0}$ and, using that time, calculates the filling status of the buffer BUF associated with that data stream as described above.

The server RB then verifies whether the rewind operation OP to the time $t_1$ is allowed. If the server RB detects that the calculated filling status is insufficient to allow the operation OP requested by the terminal equipment, then before redirecting the request R to the server $NTSS_{k0}$ it replaces the control operation OP in that request by an authorized control operation OP', namely a pause operation at the time $t_o$ in the example described here. This has the advantage of avoiding rejection of the request by the server $NTSS_{k0}$.

This request is then received and processed by the means STR of the server $NTSS_{k0}$ (step G60), which broadcast to the terminal equipment the required content of the data stream $FL_0$ from the buffer BUF. In the example described here, a fixed image of the data stream at the time $t_0$ is thus broadcast to the terminal equipment STB (execution of the command OP') (step G70).

The steps described above with reference to FIG. 3C for the operation OP are carried out for each control operation on the data stream $FL_0$ subsequently requested by the user U.

It should be noted that if the control operation OP is included in the request R_act, the steps of verification and where necessary replacement of the requested operation by an authorized operation are executed in a similar manner before the control request is redirected to the server $NTSS_{k0}$.

Figure 3D:
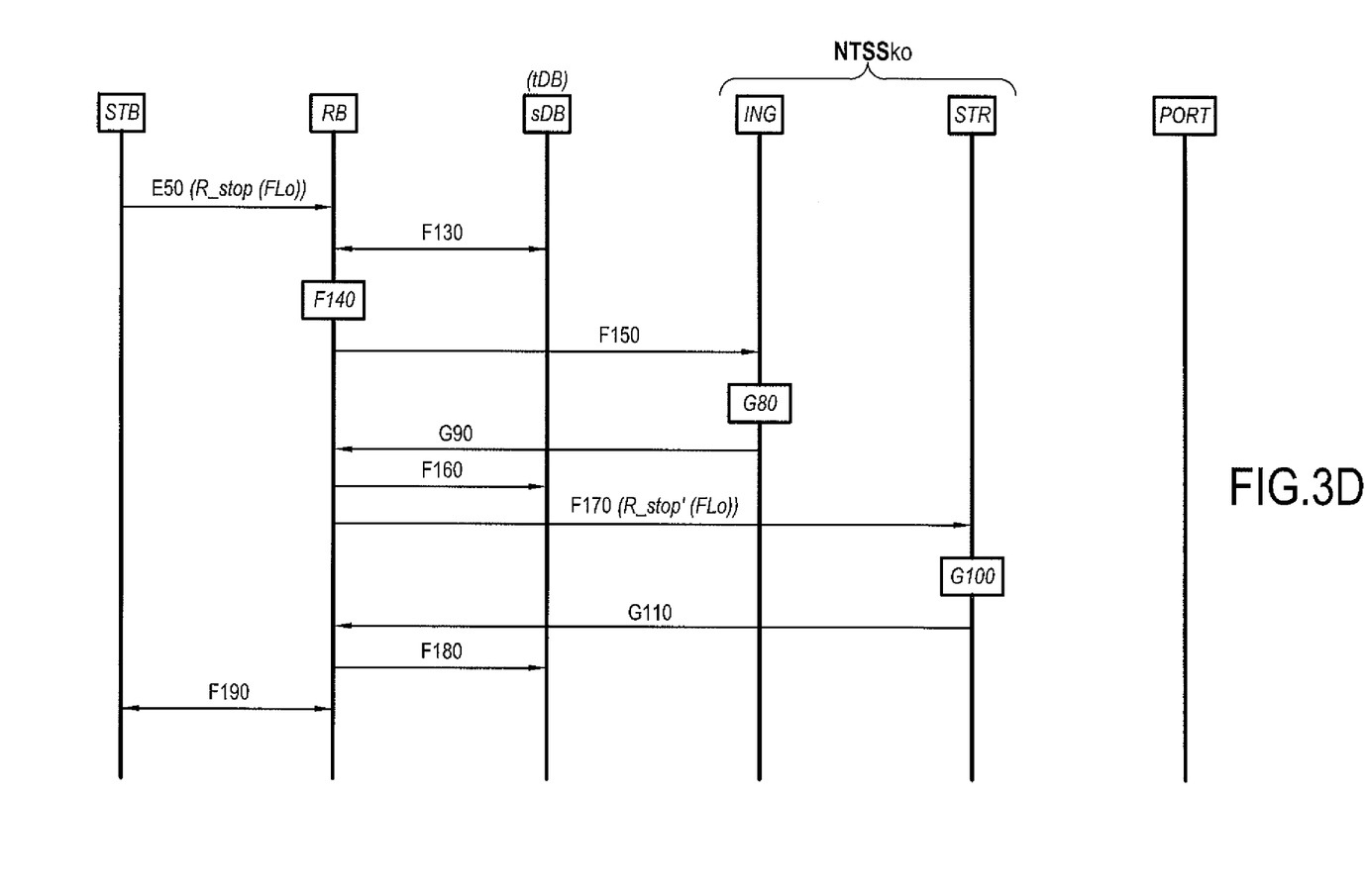

The steps executed at the time of closing sessions set up for the data stream $FL_0$ and the terminal equipment STB are described below with reference to FIG. 3D.

These session closures may be the consequence of various events, for example:

the end of the circular buffer BUF associated with the data stream $FL_0$ may be reached, following a time shifting operation requested by the terminal equipment; the means STR of the server $NTSS_{k0}$ then stop broadcasting the requested content of the data stream $FL_0$ to the terminal equipment and send an RTSP message indicating the end of the buffer ("End of Buffer" message) to the terminal equipment (a different application protocol may be used instead); on reception of this message, the terminal equipment STB sends the redirection server RB a request R_stop($FL_0$) to deactivate control (step E50);

the user U may require broadcasting to be interrupted manually while controlling the data stream $FL_0$ to the terminal equipment; under such circumstances, on reception of a command from the user (for example after the user U presses a key on the remote control of the terminal equipment STB), the terminal equipment STB sends the redirection server RB a request R_stop($FL_0$) to deactivate control (step E50).

In the context of the invention reception of this deactivation request by the redirection server RB in itself constitutes detection of a control deactivation event for the data stream $FL_0$ for the terminal equipment STB.

On detection of such an event, the redirection server RB consults the dynamic database sDB (step F130) to determine the current number of broadcast sessions set up by the server $NTSS_{k0}$ for the data stream $FL_0$ in order to find out if other broadcast sessions are in progress in the server $NTSS_{k0}$ for this data stream for other terminal equipment.

If it is determined (step F140) that the terminal equipment STB is the only terminal equipment for which a broadcast session is in progress in the server $NTSS_{k0}$ for the data stream $FL_0$, the server RB sends the means ING of the server $NTSS_{k0}$ a request to stop capture of the data stream $FL_0$ (step F150).

On reception of this request, the means ING stop capture of the data stream FL( ) and send the router ROUT a request to unsubscribe from broadcasting the data stream $FL_0$ (step G80). If necessary, the circular buffer BUF associated with the data stream $FL_0$ may also be cleared.

Stopping capture of the data stream and sending the unsubscribe request preferably occur only after a predetermined time interval during which no request is received from the terminal equipment STB, notably to avoid unintentional restarting and stopping of capture of the data stream $FL_0$ in the server $NTSS_{k0}$.

On reception by the server $NTSS_{k0}$ of a message acknowledging this stopping (step G90), the redirection server updates the database sDB to reflect the closure of the session for capture of the data stream $FL_0$ by the server $NTSS_{k0}$ (step F160).

It also redirects the stop request R_stop($FL_0$) sent by the terminal equipment STB to the means STR of the server $NTSS_{k0}$ (step F170), so that said means close the broadcast session associated with the data stream $FL_0$, and with the terminal equipment STB, and thus stop broadcasting of the data stream to the terminal equipment STB (step G100).

On reception of a message acknowledging this closure sent by the server $NTSS_{k0}$ (step G110), the redirection server updates the database sDB to reflect closing of the broadcast session of the data stream $FL_0$ by the server $NTSS_{k0}$ for the terminal equipment STB (step F180). The current number DCurr(k0) of broadcast sessions managed by the server $NTSS_{k0}$ is therefore decremented by 1.

The session set up between the terminal equipment STB and the server RB is then cancelled (step F190) and the periodic sending of keep alive messages is stopped.

It should further be noted that, if a policy of the operator has been defined to specify a type of recording of the data streams broadcast by the program channels, the redirection server RB consults the corresponding dynamic database oDB and determines whether the data stream concerned is being captured statically by the broadcast server $NTSS_{k0}$. If so, it does not send that server a request to stop capture.

If the user U so requires, the terminal equipment STB may then request a new status of the buffer from the portal PORT.

It should be noted that the broadcast and capture sessions and the control session set up between the terminal equipment and redirection server may also be interrupted because of exceptional and unexpected events, for example:

the terminal equipment STB may be switched off inadvertently; it can then no longer respond to keep alive messages sent by the redirection server RB; non-reception of these messages in itself constitutes a control deactivation event detected by the direction server;

during a broadcast session, the means STR may stop broadcasting the required contents of the buffer BUF unexpectedly; the terminal equipment STB then detects the non-reception of data stream by the means STR and sends the redirection server a request to deactivate control;

during a capture session, the means INC may inadvertently stop capturing the data stream $FL_0$; the terminal equipment STB then detects an abnormal data stream sent by the means STR and after a predetermined time interval sends a control deactivation request to the redirection server.

It may happen that recording of the data stream $FL_0$ by the selected server $NTSS_{k0}$ is not possible because of a problem in the telecommunications network 1 or a software and/or hardware problem. The selected server $NTSS_{k0}$ then sends a non-acknowledgement (NACK) message to the redirection server, which may either select another server or refuse access by the terminal equipment STB to the control service nTS for this data stream.

It should be noted that in the embodiment described here the means used to implement the redirection method of the invention are located in the same device (namely the redirection server RB). Alternatively, these means (and the associated functions) could be distributed between different devices, for example the redirection server RB and the broadcast servers NTSS.

Moreover, in a different embodiment of the invention, there could advantageously also be considered, in addition to the plurality of broadcast servers considered above providing dynamic capture of the data streams, one or more additional broadcast servers adapted to capture statically (continuously) a predefined list of data streams. Thus the data streams most requested by users could be allocated to these additional broadcast servers, for example, and control requests sent by a terminal equipment relating to these data streams could be redirected systematically (via the redirection server RB) to those servers (provided of course that they are not congested). The servers of the plurality of servers considered above could then be used either to capture and broadcast the less requested data streams or in support of the additional servers if their capacity should become insufficient.

The invention claimed is:

1. A method of redirecting a request sent by a terminal equipment for control of a data stream broadcast by a source in a telecommunications network, wherein said method comprises:
    on reception of said request, obtaining information representing a current data stream control capacity for a plurality of broadcast servers;
    selecting from said plurality of servers, with the aid of at least the above information, a server able to control said data stream broadcast by the source, wherein said selecting takes into account a capture type for the data stream for at least one broadcast server, said capture type being selected from at least a static capture type and a dynamic capture type;
    sending a request to capture this data stream to the selected server if it is not already capturing said data stream for at least one other terminal equipment; and
    redirecting the control request to the selected server.

2. The redirection method according to claim 1, wherein the information representing a current data stream control capacity of a server includes information representing:
    a current broadcast session capacity of that server; and
    a current data stream capture capacity of that server.

3. The redirection method according to claim 1, further comprising, after the selecting process, setting up a session with the terminal equipment for this data stream and at least one other request to control this data stream sent by the terminal equipment is redirected to the selected server during this session.

4. The redirection method according to claim 1, wherein during the selecting process the server is also selected as a function of its proximity to the terminal equipment.

5. The redirection method according to claim 1, wherein during the selecting process the server is also selected as a function of whether it is already capturing a data stream for at least one other terminal equipment.

6. The redirection method according to claim 1, further comprising:
    detecting an event deactivating control of the data stream by the terminal equipment;
    determining whether the server selected for the data stream for the terminal equipment is capturing that data stream for at least one other terminal equipment; and
    if not, sending the selected server a request to end capture of this data stream.

7. The redirection method according to claim 6, further comprising determining a data stream capture type, said capture type being selected from at least a static capture type and a dynamic capture type, and, if it is determined that the capture type is static, sending a request to end capture is not executed.

8. The redirection method according to claim 1, further comprising, before redirecting the data stream control request to the selected server:
    detecting whether the control request includes a control operation that cannot be executed by the selected server; and
    replacing that control operation in the control request with an authorized control operation.

9. A computer program including instructions for executing the steps of the redirection method according to claim 1 when said program is executed by a computer.

10. A device for redirecting a request sent by a terminal equipment to control a data stream broadcast by a source in a telecommunications network, wherein said device comprises:
    a component configured to be activated on reception of said request for obtaining information representing a current data stream control capacity for a plurality of broadcast servers;
    a component configured to select from said plurality of servers, with the aid of at least the above information, a server able to control said data stream broadcast by the source, wherein said selecting component takes into account a capture type for the data stream for at least one broadcast server, said capture type being selected from at least a static capture type and a dynamic capture type;
    a component configured to determine whether the selected server is already capturing said data stream for at least one other terminal equipment or not;
    a component configured to send a request to capture this data stream to the selected server, and activated if said server is not already capturing said data stream for at least one other terminal equipment; and
    a component configured to redirect the control request to the selected server.

11. The redirection device according to claim 10, further comprising a component configured to set up a session with the terminal equipment for this data stream and, during this session, redirecting at least one other request to control this data stream sent by the terminal equipment to the selected server.

* * * * *

UNITED STATES PATENT AND TRADEMARK OFFICE
CERTIFICATE OF CORRECTION

PATENT NO. : 8,639,777 B2  Page 1 of 1
APPLICATION NO. : 13/062906
DATED : January 28, 2014
INVENTOR(S) : Fieau et al.

It is certified that error appears in the above-identified patent and that said Letters Patent is hereby corrected as shown below:

On the Title Page (item 57, Abstract) at line 6, Change "info cation" to --information--.

In the Specification

In column 11 at line 5, Change "means INC" to --means ING--.

In column 11 at line 15, Change "means INC" to --means ING--.

In column 14 at line 57, Change "means INC" to --means ING--.

Signed and Sealed this
Twenty-ninth Day of July, 2014

Michelle K. Lee
*Deputy Director of the United States Patent and Trademark Office*